United States Patent
Fremerey

(10) Patent No.: US 7,023,117 B2
(45) Date of Patent: Apr. 4, 2006

(54) MAGNETIC BEARING ARRANGEMENT

(75) Inventor: John K. Fremerey, Bonn (DE)

(73) Assignee: Forschungazentrum Julich GmbH, Julich (DE)

( * ) Notice: Subject to any disclaimer, the term of this patent is extended or adjusted under 35 U.S.C. 154(b) by 0 days.

(21) Appl. No.: 10/363,397

(22) PCT Filed: Aug. 17, 2001

(86) PCT No.: PCT/EP01/09493

§ 371 (c)(1),
(2), (4) Date: Mar. 3, 2003

(87) PCT Pub. No.: WO02/27205

PCT Pub. Date: Apr. 4, 2002

(65) Prior Publication Data

US 2003/0189383 A1    Oct. 9, 2003

(30) Foreign Application Priority Data

Sep. 2, 2000    (DE) .............................. 100 43 302

(51) Int. Cl.
*H02K 7/09*    (2006.01)
(52) U.S. Cl. .................................................. 310/90.5
(58) Field of Classification Search ............... 310/90.5, 310/12, 181
See application file for complete search history.

(56) References Cited

U.S. PATENT DOCUMENTS

| | | | |
|---|---|---|---|
| 3,243,238 A * | 3/1966 | Lyman ....................... | 310/90.5 |
| 3,860,300 A * | 1/1975 | Lyman ....................... | 310/90.5 |
| 3,934,950 A * | 1/1976 | Kuhlmann .................. | 310/90.5 |
| 4,040,681 A * | 8/1977 | van der Heide ........... | 310/90.5 |
| 4,363,525 A * | 12/1982 | Poubeau ..................... | 310/90 |
| 4,379,598 A * | 4/1983 | Goldowsky ................ | 310/90.5 |
| 4,387,935 A | 6/1983 | Studer ....................... | 310/90.5 |
| 5,126,610 A * | 6/1992 | Fremerey ................... | 310/90.5 |
| 5,159,219 A * | 10/1992 | Chu et al. .................. | 310/90.5 |
| 5,587,617 A * | 12/1996 | Dunfield et al. ........... | 310/90.5 |
| 5,686,772 A * | 11/1997 | Delamare et al. .......... | 310/90.5 |

(Continued)

FOREIGN PATENT DOCUMENTS

DE              29 19 236        11/1980

(Continued)

*Primary Examiner*—Dang Le
(74) *Attorney, Agent, or Firm*—Berenato, White & Stavish, LLC

(57) ABSTRACT

A magnetic bearing arrangement (1) for a motion element, having the following features: the magnetic bearing arrangement has a stator. The magnetic bearing arrangement has a passive magnetic bearing (3, 8, 9) for lateral guidance of the motion element (2) and a controllable magnetic bearing (3, 5) for guidance of the motion element perpendicular to the guidance by way of the passive magnetic bearing. The controllable magnetic bearing has an electronic stabilization device; the stabilization device has an electrical conductor (6, 7) that can have an electrical control current applied to it by the stabilization device and that is associated with the stator element (5) in such a way that the magnetization of the stator element is influenced by the control current. The controllable magnetic bearing has a permanent magnet (3); the permanent magnet is arranged on the motion element opposite the stator element. The magnetic force between permanent magnet and stator element is dimensioned such that with a control current of zero, the motion element is held in the working position; and only upon deviation from that working position is a control current generated that influences the magnetization of the stator element in the direction of re-establishing the working position.

32 Claims, 6 Drawing Sheets

U.S. PATENT DOCUMENTS

| | | | |
|---|---|---|---|
| 5,729,065 A * | 3/1998 | Fremery et al. | 310/90.5 |
| 5,751,085 A * | 5/1998 | Hayashi | 310/90 |
| 5,834,867 A * | 11/1998 | Kikuchi et al. | 310/51 |
| 5,982,065 A | 11/1999 | Jamain et al. | 310/90.5 |
| 6,424,067 B1 * | 7/2002 | Samways | 310/90.5 |

FOREIGN PATENT DOCUMENTS

| | | |
|---|---|---|
| DE | 38 18 556 A1 | 12/1989 |
| DE | 42 10 741 | 10/1993 |
| WO | WO 02/27205 A1 | 4/2002 |

* cited by examiner

MAGNETIC BEARING ARRANGEMENT

FIELD OF THE INVENTION

The invention concerns a magnetic bearing arrangement for a motion element, having the features of the preamble of claim 1.

BACKGROUND OF THE INVENTION

DE 38 18 556 A1 discloses a magnetic bearing arrangement of this kind within a vacuum pump. It has as the motion element a rotor on which are mounted rotor blades that alternate with stator blades. Provided for lateral guidance of the rotor are two passive magnetic bearings, arranged at an axial spacing, that each comprise two concentric circular permanent magnets of which one is arranged on the rotor and the other on the stator, i.e. immovably on the unit, and which are magnetized in mutually repulsive fashion.

Arranged at the lower end of the rotor is a controllable magnetic bearing having an electromagnet that acts on an attraction disk attached to the rotor. The electromagnet comprises, in usual fashion, a magnetizable core constituting a stator element, and a coil comprising an electrical conductor. Excitation of the electromagnet is controlled by a stabilization device which has a position sensor to sense the axial position of the rotor. By means of the electromagnet, the rotor is held in a working position in which the permanent magnets of the passive magnetic bearings are displaced with respect to one another in such a way that they generate an axial force opposed to the attractive force of the electromagnet. The working position is provided in such a way that the electromagnet must always be excited in order to hold the working position. By varying the excitation, the stabilization device ensures that the rotor is always moved back into the working position in the event of an axial displacement It is a disadvantage of this magnetic bearing arrangement that a control current is constantly required in order to hold the rotor in the working position by way of the electromagnets. In addition, stabilization is difficult because the magnetic force profile of the electromagnet is not linear.

German Unexamined Application DE-OS 29 19 236 discloses a magnetic bearing arrangement, for example for flow measurements, that has as the motion element a horizontally extending rotor. In order to hold the rotor in floating fashion, here again two passive magnetic bearings, each having a stator-side and a rotor-side permanent magnet that are magnetized in mutually repulsive fashion, are provided, the field components of the two passive magnetic bearings being directly oppositely.

Arranged in the gap between the two passive magnetic bearings is a magnet coil with which the magnetic fields of the passive magnetic bearings can be superimposed. Excitation of the magnet coil is controlled by a regulation device which includes position sensors that sense the axial displacement of the rotor in non-contact fashion and regulate the excitation current as a function of the axial displacement. The rotor is held in a specific working position depending on the direction and magnitude of the electrical currents in the magnet coil.

A disadvantage of this bearing is the large distance between the magnet coil and the permanent magnets attached to the motion element. The return forces achievable for stabilizing the working position of the motion element are correspondingly low. In addition, the magnet coil occupies the space in which, in the case of a rotor bearing arrangement, the rotary field stator for rotational drive would advantageously be placed.

It is the object of the invention to embody a magnetic bearing arrangement of the kind cited above in such a way that it is of the simplest possible configuration and consumes little power.

This object is achieved, according to the present invention, by way of the following features:

l) the controllable magnetic bearing has a permanent magnet;

m) the permanent magnet is arranged on the motion element opposite the stator element;

n) the magnetic force between permanent magnet and stator element is dimensioned such that with a control current of zero, the motion element is held in the working position; and that only upon deviation from that working position is a control current generated that influences the magnetization of the stator element in the direction of re-establishing the working position.

SUMMARY OF THE INVENTION

The basic idea of the invention is to stabilize a motion element, passively stabilized by repulsive magnetic forces, in an unstable working position by way of an adjacent stator element having an attractive effect; and to apply a control current to the stator element only if the motion element leaves that working position. Since a control current flows only in that situation, power consumption is low. In addition, the magnetic bearing arrangement according to the present invention is characterized by a simple physical design, and is suitable for motion elements moving both in translation and in rotation.

When the word "a" or a word derived therefrom appears above, it is to be understood not as a numerical term but rather as the indefinite article. This applies consistently to all the claims.

The stator element preferably is made of a magnetically soft steel. It can also be embodied as a permanent magnet, or assembled from ferromagnetic and permanent-magnet parts.

The possibility exists, in principle, of assembling the permanent magnets from several sub-magnets that rest flush against one another or are at a spacing from one another.

To allow the working position of the motion elements to be better stabilized, the invention furthermore provides for the stator element to have several electrical conductors, and for each electrical conductor to be part of a separate stabilization device. Each electrical conductor then receives, via the respectively associated stabilization device, a separate control current whose magnitude and direction are determined by the respective position sensor.

A particularly simple embodiment of the magnetic bearing arrangement according to the present invention is obtained if the permanent magnet of the controllable magnetic bearing simultaneously also constitutes the motion-element-side permanent magnet of the associated passive magnetic bearing, so that the stator-side permanent magnet (s) of the passive magnetic bearing lies/lie adjacent to the permanent magnet of that controllable magnetic bearing.

For elongated motion elements, it is recommended to arrange several passive magnetic bearings for lateral guidance of the motion element, with mutually repulsive motion-element-side and stator-side permanent magnets being provided. The passive magnetic bearings should be arranged at the end regions of the motion element.

It is also possible to provide several controllable magnetic bearings each having a motion-element-side permanent magnet and a stator element. This arrangement is recommended in particular when at least one separate stabilization device is associated with each stator element. Also possible in this context is an embodiment in which controllable magnetic bearings are arranged at the ends of the motion element and their permanent magnets each have adjacently associated with them a stator-side permanent magnet of a passive magnetic bearing, in such a way that the permanent magnets of the controllable magnetic bearings simultaneously constitute the motion-element-side permanent magnets of the passive magnetic bearing.

The motion element can be embodied as a linearly movable member whose permanent magnet(s), like the permanent magnets of the passive magnetic bearing(s), extend in the motion direction. The motion element can instead, however, also be embodied as a rotational member whose permanent magnet(s), like the permanent magnets of the passive magnetic bearing(s), are also circular in shape. The motion element and stator element can have an annular shape, and several (preferably at least three) electrical conductors, each of which is part of an independent stabilization device, can be arranged in distributed fashion over the stator element. The permanent magnet of the controllable magnetic bearing should then simultaneously constitute the motion-element-side permanent magnet of the passive magnetic bearing, and should be surrounded by the stator-side permanent magnet of the passive magnetic bearing. As an alternative to this, the possibility exists for the permanent magnet of the controllable magnetic bearing to surround the stator-side permanent magnet of the passive magnetic bearing. Both possibilities are, in general, sufficient to hold the motion element in the working position. This does not, however, exclude an embodiment in which the permanent magnet of the controllable magnetic bearing is enclosed internally and externally by a respective circular stator-side permanent magnet of the passive magnetic bearing.

The invention is illustrated in more detail, with reference to exemplary embodiments, in the drawings, in which:

DETAILED DESCRIPTION OF THE PREFERRED EMBODIMENTS

Figure 1:
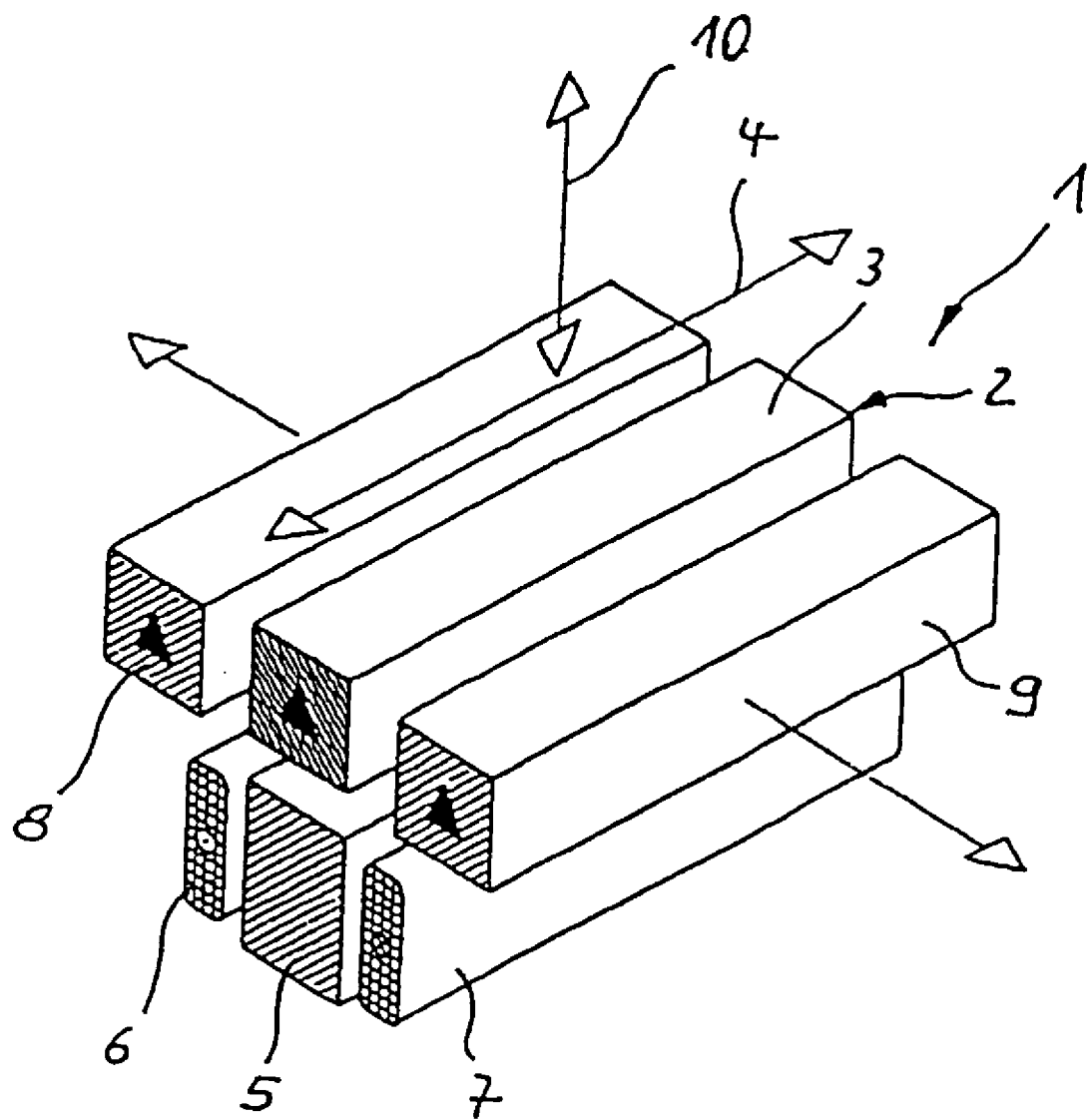
FIG. 1 shows, in an oblique view, a first embodiment of a magnetic bearing arrangement having a linearly movable motion element.

Magnetic bearing arrangement 1 depicted in FIG. 1 has a motion element 2, extending in a bar shape and rectangular in cross section, that comprises a permanent magnet 3, the magnetization direction being indicated by the arrow on the end face of motion element 2. Motion element 2 is movable in the directions of double arrow 4 and is suitable, for example, as a part of linear motors or linear guidance systems.

Arranged immovably on the unit below permanent magnet 3 and extending parallel to motion element 2 is a stator element 5 made of magnetizable material, preferably magnetically soft steel. Arranged on either side of stator element 5 are electrical conductors 6, 7 that belong to a stabilization device by way of which a control current can be delivered onto electrical conductors 6, 7.

Arranged on either side of motion element 2 are two stator-side permanent magnets 8, 9 that, as indicated by the arrow symbols on the end faces, are magnetized in the same direction as permanent magnet 3 of motion element 2. As a result, repulsive magnetic forces are created between permanent magnets 8, 9 and motion element 2, thereby elastically holding motion element 2 in the center between permanent magnets 8, 9. The three permanent magnets 3, 8, 9 thus constitute a passive magnetic bearing for lateral guidance of motion element 2. Permanent magnets 8, 9 are part of the stator, which is not depicted here in more detail.

Two magnetic forces that compensate for one another act in vertical direction 10 on motion element 2. The attractive force between stator element 5 and permanent magnet 3 is dimensioned so that motion element 2 is held in a working position offset slightly upward with respect to permanent magnets 8, 9, in which permanent magnets 8, 9 exert an upwardly directed magnetic force. This working position is unstable, however, so that motion element 2 can break away upward or downward. This offset is sensed by a position sensor (not depicted in more detail) that scans in non-contact fashion on an inductive, galvanomagnetic, capacitative, or optical basis and causes the stabilization device to deliver through electrical conductors 6, 7 a current which influences the magnetization of stator element 5 in such a way that motion element 2 is moved back into the working position.

Once motion element 2 has again assumed its working position, the control current goes to zero, i.e. in this position, magnetic bearing arrangement 1 consumes no current. Permanent magnet 3 and stator element 5 thus constitute, with the stabilization device, a controllable magnetic bearing, permanent magnet 3 also being simultaneously part of the passive magnetic bearing.

Figure 2:
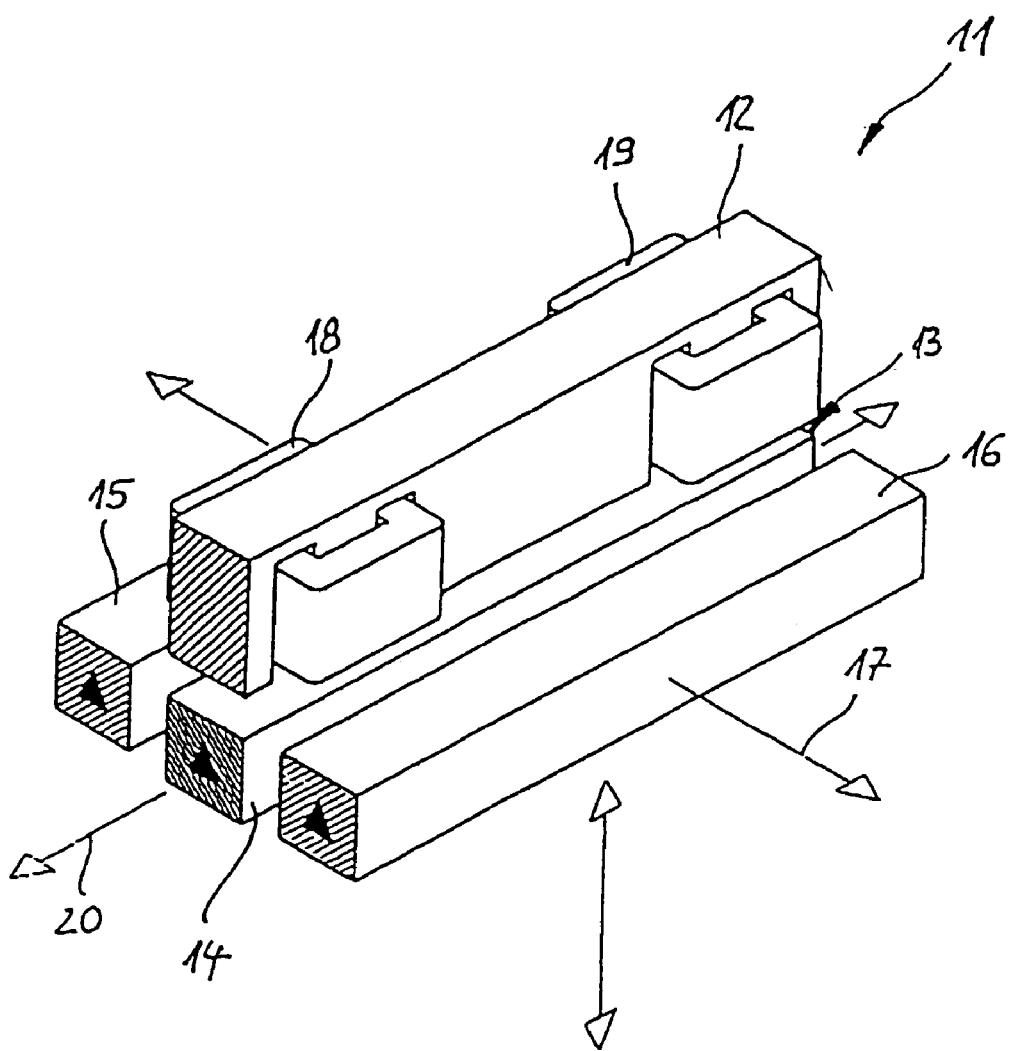
FIG. 2 shows, in an oblique view, a second embodiment of a magnetic bearing arrangement having a linearly movable motion element.

Magnetic bearing arrangement 11 depicted in FIG. 2 differs from magnetic bearing arrangement 1 according to FIG. 1 only by having a different arrangement of stator element 12, and by the fact that two stabilization devices are provided. Stator element 12 is now arranged above motion element 13. The magnetic force acting between stator element 12 and permanent magnet 14 of motion element 13 is dimensioned such that motion element 13 is offset into the working position downward with respect to the two laterally extending permanent magnets 15, 16, so that because of the repulsive magnetic forces, these permanent magnets 15, 16 not only guide motion element 13 laterally but also exert a downwardly directed force.

That force is opposed by the attractive force between permanent magnet 15 of motion element 13 and stator element 12; the two forces cancel one another out when permanent magnet 14 is located in the slightly downwardly offset working position described above.

So that tilting of motion element 13 about transverse axis 17 can be reliably prevented, magnetic bearing arrangement 11 comprises two stabilization devices that each have an electrical conductor 18, 19. Electrical conductors 18, 19 are arranged at the ends of stator element 12 in the form of windings, and each have associated with them separate position sensors (not depicted here) which sense the position of motion element 13 in the regions of electrical conductors 18, 19, so that depending on the motion of motion element 13 about transverse axis 17, they have different control currents applied to them in order to align motion element 13 once again parallel to stator element 12.

Here as well, motion element 13 is movable in longitudinal direction 20 and is therefore useful for applications for which magnetic bearing arrangement 1 shown in FIG. 1 is also suitable.

Figure 3:
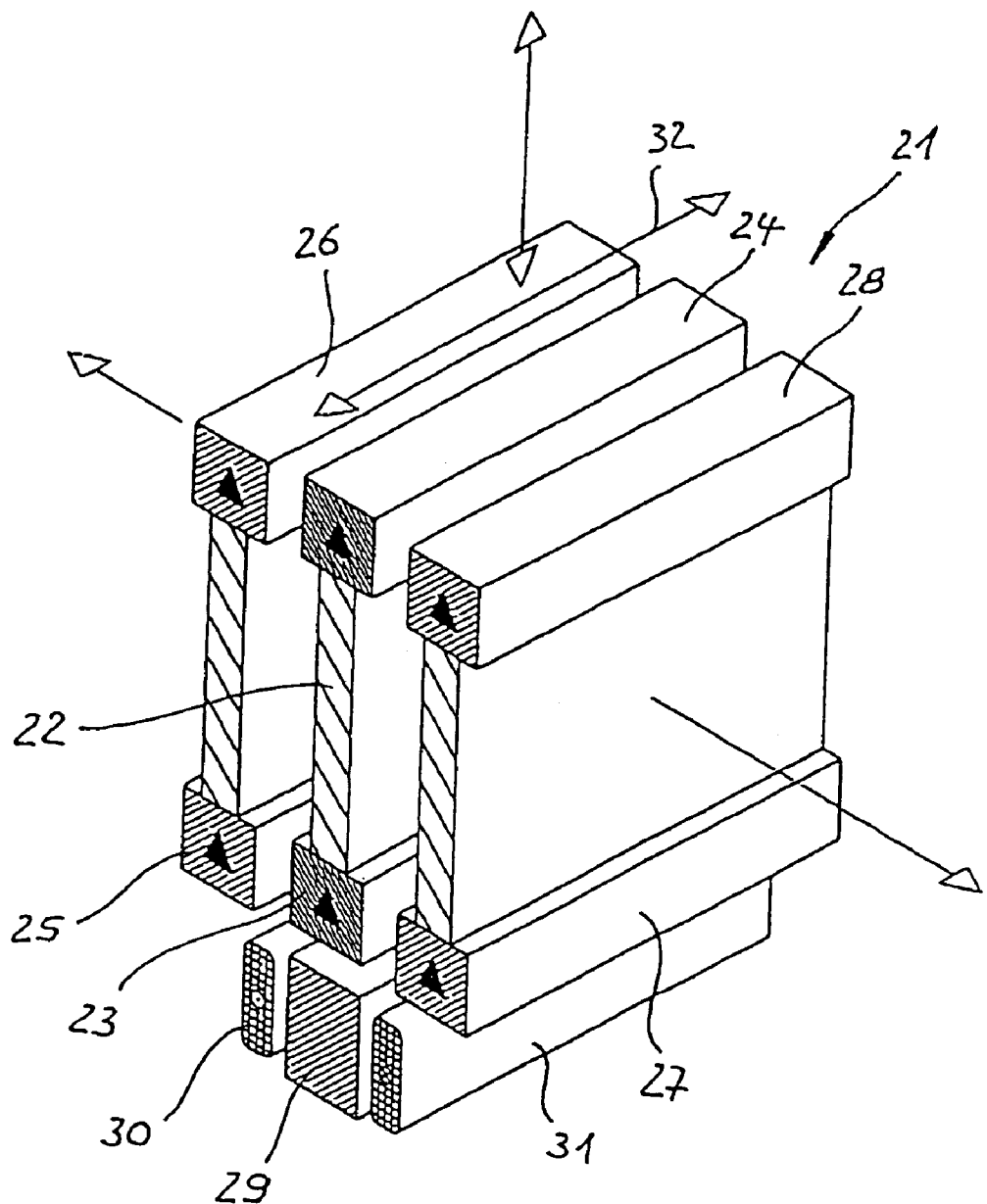
FIG. 3 shows, in an oblique view, a third embodiment of a magnetic bearing arrangement having a linearly movable motion element.

FIG. 3 shows a further magnetic bearing arrangement 21 that represents a variation of magnetic bearing arrangement 1 according to FIG. 1. It has a plate-shaped motion element 22 standing on edge, which has, both on the underside and on the upper side, horizontally extending permanent magnets 23, 24 that are magnetized in the same direction. Adjacent to each of permanent magnets 23, 24 are two stator-side and therefore immovably unit-mounted permanent magnets 25, 26 and 27, 28, respectively, which are magnetized in the same direction and therefore guide motion element 22 laterally by magnetic repulsion. Each three permanent magnets 23, 25, 26 and 24, 27, 28 constitute a respective passive magnetic bearing for lateral guidance of motion element 22; here, in contrast to magnetic bearing arrangement 1 according to FIG. 1, motion element 22 is guided in a manner stabilized against tilting about the motion axis.

Arranged below lower permanent magnet 23 of motion element 22 is a stator element 29 that is enclosed on either side by electrical conductors 30, 31 of a stabilization device. By way of the attractive force between permanent magnet 23 and stator element 29 made of magnetically soft material, motion element 22 is held (as in the case of magnetic bearing arrangement 1) in a working position offset slightly upward with respect to permanent magnets 25, 26 and 27, 28, in which permanent magnets 25, 26, 27, 28 exert on motion element 22 an upwardly directed magnetic force that is compensated for by the attractive force between permanent magnet 23 and stator element 29. If motion element 22 leaves this working position upward or downward, the stabilization device applies to electrical conductors 30, 31 a control current that influences the attractive force between permanent magnet 23 and stator element 29 in such a way that motion element 22 is returned to its working position. Permanent magnet 23 is thus part of the lower passive magnetic bearing, and also part of the controllable magnetic bearing.

It is understood that stator element 29 can also be equipped with two independent stabilization devices as in the exemplary embodiment shown in FIG. 2. In addition, motion element 22 shown here is also linearly movable in the directions indicated by double arrow 32, and is thus also suitable for the applications for which magnetic bearing arrangements 1, 11 according to FIGS. 1 and 2 are provided.

Figure 4:
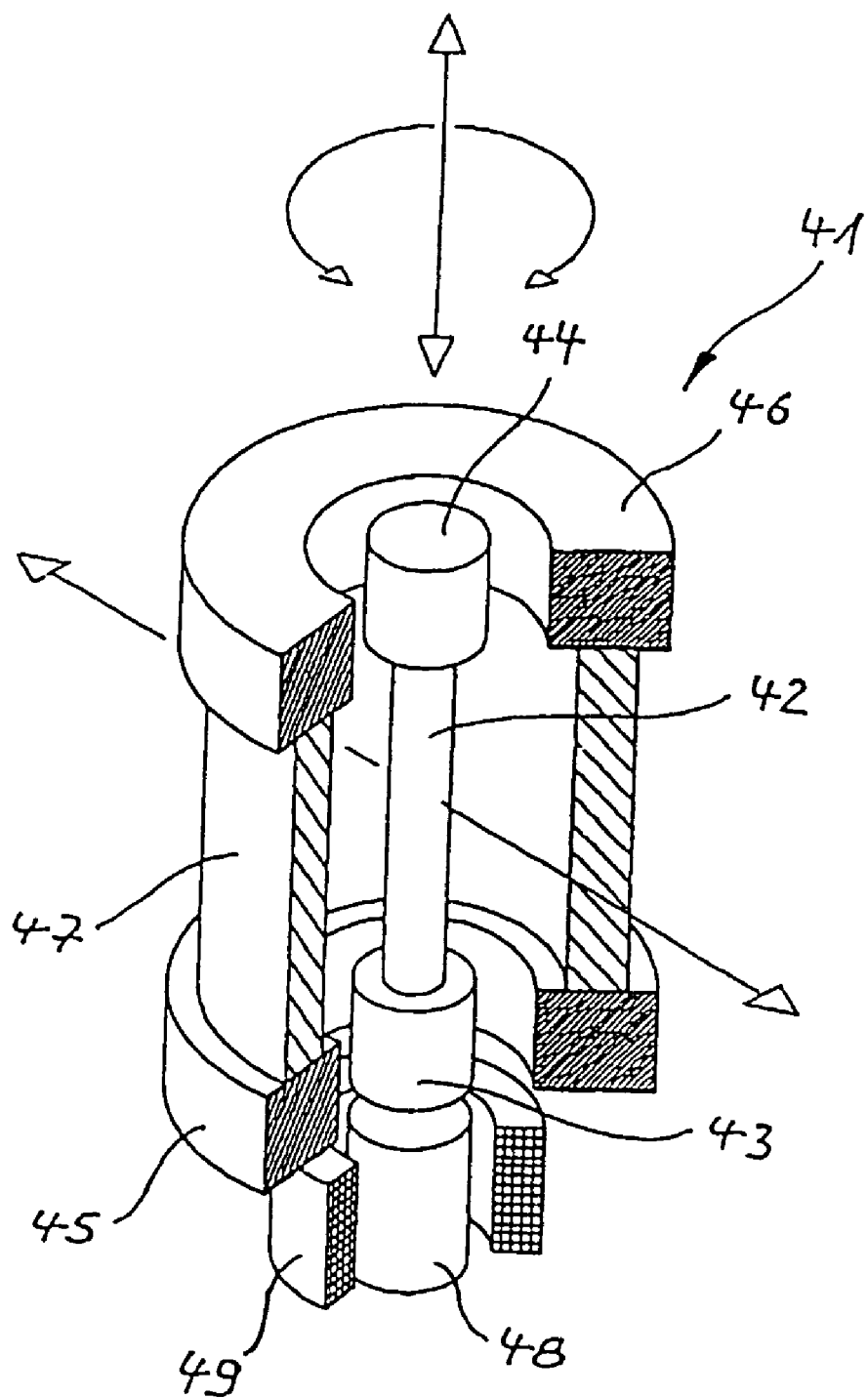
FIG. 4 shows, in a partially sectioned oblique view, a first embodiment of a magnetic bearing arrangement having a rotationally movable motion element.

Magnetic bearing arrangement 41 depicted in FIG. 4 constitutes a rotationally symmetrical variant of the magnetic bearing arrangement according to FIG. 3. Magnetic bearing arrangement 41 has a vertically extending rotor 42, rotatable about the vertical axis, as the motion element, which has at each of its end faces a circular permanent magnet 43, 44. Permanent magnets 43, 44 are each surrounded by annular permanent magnets 45, 46 which are parts of the stator and are joined by a circular sleeve 47. Permanent magnets 45, 46 and sleeve 47 are depicted in section and therefore only partially, in order to make rotor 42 visible. Permanent magnets 45, 46 are magnetized in the same direction as permanent magnets 43, 44 of rotor 42, so that repulsive magnetic forces act between permanent magnets 43, 45 and 44, 46 and radially center rotor 42. The respectively adjacent pairs of permanent magnets 43, 45 and 44, 46 constitute passive magnetic bearings.

Arranged below the end face of lower permanent magnet 43 of rotor 42 is a cylindrical stator element 48 that is surrounded by an electrical conductor 49 which is depicted in section. Electrical conductor 49 is part of a stabilization device (not depicted here in more detail) that also includes a position sensor which senses the vertical position of rotor 42. The magnetic force acting between lower permanent magnet 43 of rotor 42 and stator element 48 is dimensioned such that permanent magnets 43, 44 of rotor 42 are offset slightly upward with respect to permanent magnets 45 and 46 that surround them, so that an equilibrium of forces exists between the upwardly directed vertical force proceeding from permanent magnets 45, 46 and the attractive force between permanent magnet 43 and stator element 48. If rotor 42 is deflected vertically, the position sensor senses this and causes the stabilization device to deliver onto electrical conductor 49 a control current such that the magnetization of stator element 48 is influenced in such a way that rotor 42 returns to its working position.

Figure 5:
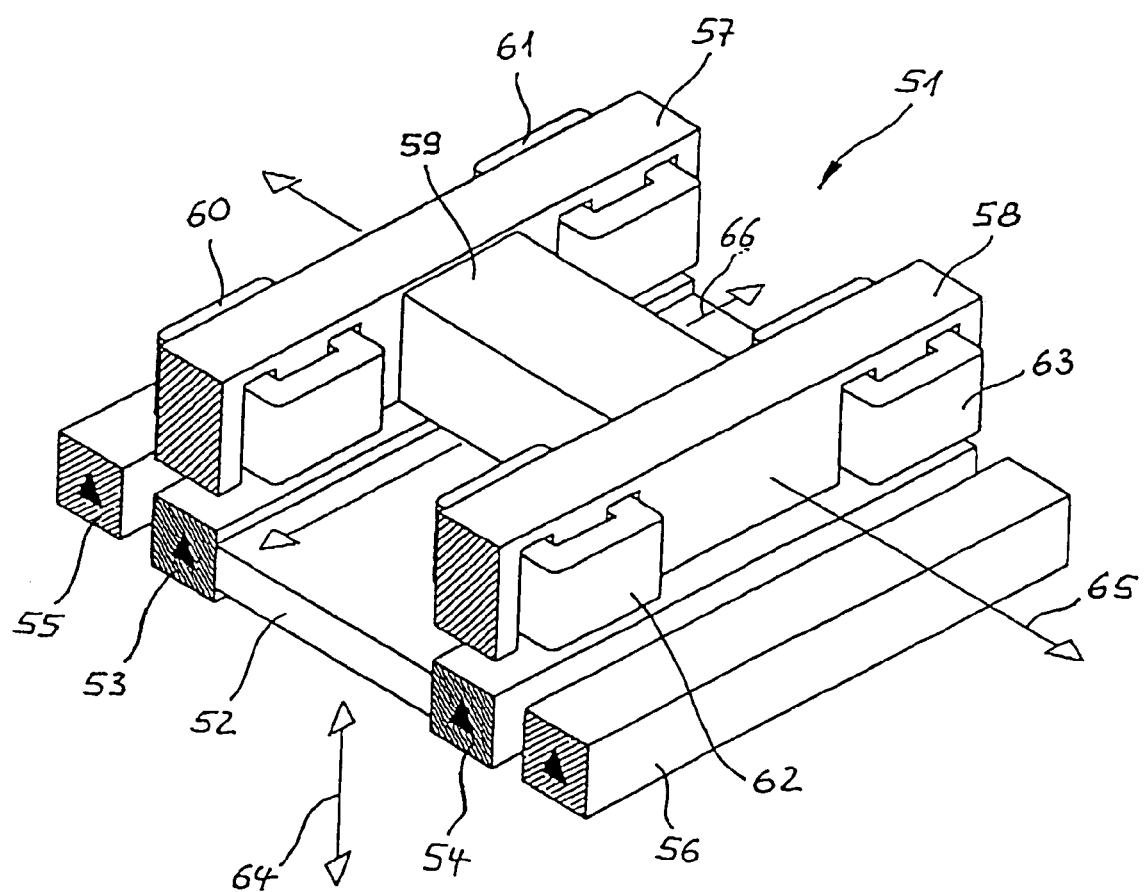
FIG. 5 shows, in an oblique view, a fourth embodiment of a magnetic bearing arrangement having a linearly movable motion element.

FIG. 5 shows a magnetic bearing arrangement which represents a variant of the magnetic bearing arrangement according to FIG. 2. Magnetic bearing arrangement 51 has a plate-shaped motion element 52, extending horizontally, that is delimited on either side by bar-shaped permanent magnets 53, 54. Extending parallel thereto are stator-side permanent magnets 55, 56 which are magnetized in the same direction as permanent magnets 53, 54 on motion element 52. Repulsive magnetic forces are thereby created between the respective adjacent permanent magnets 53, 55 and 54, 56, and guide motion element 52 laterally. Each pair of adjacent permanent magnets 53, 55 and 54, 56 constitutes a passive magnetic bearing.

Arranged above each of permanent magnets 53, 54 of motion element 52 is a stator element 57, 58 that extends parallel to permanent magnets 53, 54 and is made of magnetically soft steel. Stator elements 57, 58 are connected by a bridge 59.

As in the exemplary embodiment shown in FIG. 2, stator elements 57, 58 each have two electrical conductors 60, 61 and 62, 63, which are respectively arranged in the region of the ends of stator elements 57, 58. Each electrical conductor 60, 61, 62, 63 belongs to a separate stabilization device having a respective position sensor, so that electrical conductors 60, 61, 62, 63 can have different control currents applied to them.

Motion element 52 is held by the magnetic forces acting in vertical direction 64 in a working position that is offset slightly downward with respect to the planes occupied by permanent magnets 55, 56. Permanent magnets 55, 56 thus exert on motion element 52 a downwardly directed magnetic force that is compensated for by the magnetic forces acting between the motion-element-side permanent magnets 53, 54 and the relevant stator elements 57, 58. Permanent magnets 53, 54 are not only part of the passive magnetic bearings (respectively comprising the two adjacent permanent magnets 55, 57 and 56, 58), but also are part of two controlled magnetic bearings comprising permanent magnet 53 and stator element 57 on the one hand, and permanent magnet 56 and stator element 58 on the other hand. Any deflection of motion element 53 in vertical direction 64 is sensed by the position sensors and results in an application of control current to electrical conductors 60, 61, 62, 63 that turns the deflection back in the direction toward the working position by appropriate magnetization of stator elements 57, 58. Any tilting of motion element 52 about horizontal axis 65 is also sensed by the position sensors, in which case electrical conductors 60, 61, 62, 63 receive different control currents depending on the tilting motion of motion element 52, thus bringing motion element 52 back into the working position.

Motion element 52 is horizontally linearly movable in the direction of double arrow 66, and is therefore suitable for linear motors or linear guidance systems.

Figure 6:
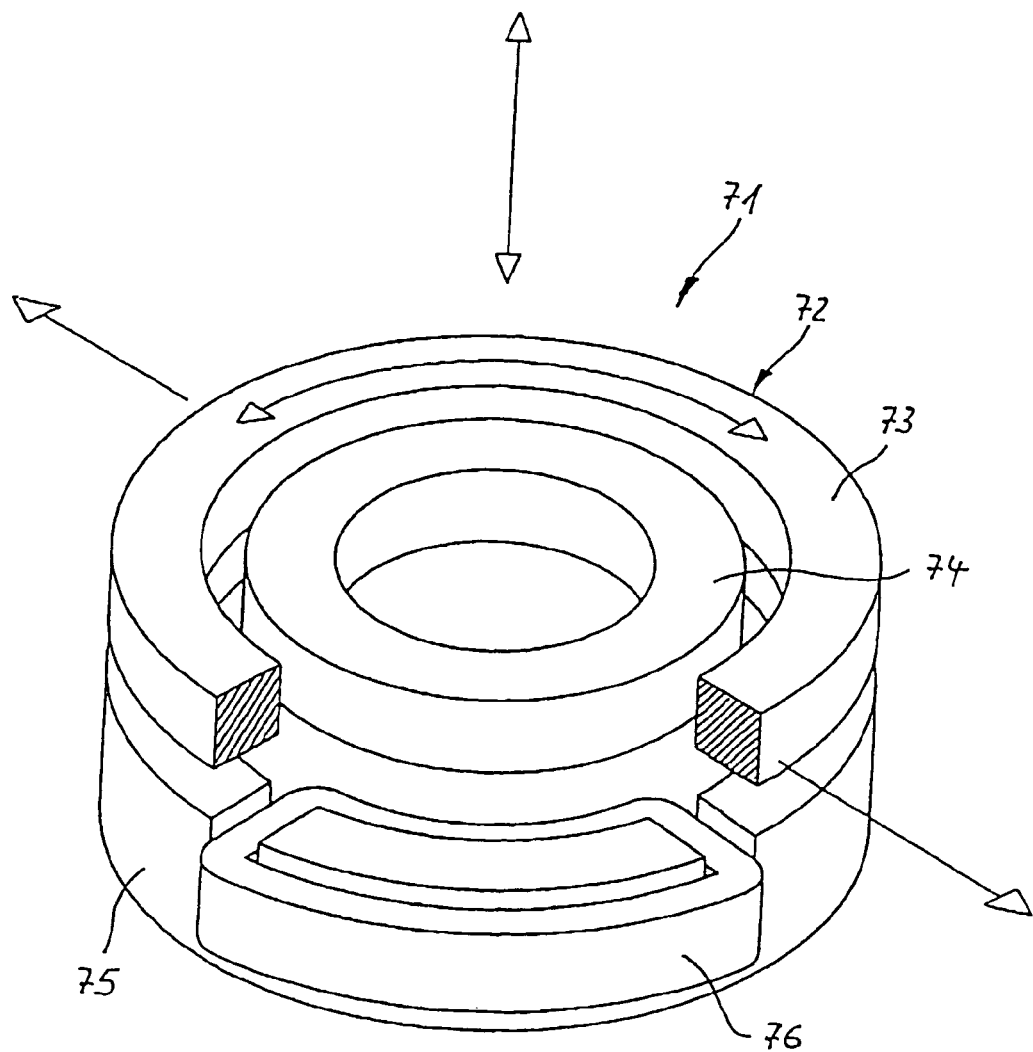
FIG. 6 shows, in a partially sectioned oblique view, a second embodiment of a magnetic bearing arrangement having a rotationally movable motion element.

FIG. 6 depicts a magnetic bearing arrangement 71 which has as the motion element an annular rotor 72 that is depicted in partially cutaway fashion. Rotor 72 is embodied as a permanent magnet 73, and surrounds a stator-side permanent magnet 74. The two permanent magnets 73, 74 are magnetized in the same direction, so that they repel one another and rotor 72 is held in horizontally centered fashion with respect to permanent magnet 74.

Arranged below rotor 72 is an annular stator element 75 made of magnetically soft steel. Three electrical conductors 76 guided in a coil shape, of which only one is shown here, are distributed over the periphery of stator element 75. Each electrical conductor 76 is coupled to a separate stabilization device having a respective position sensor that senses the vertical position of rotor 72 at certain points.

Rotor 72 is held in a working position in which it is offset slightly upward with respect to stator-side permanent magnet 74. As a result, an upwardly directed magnetic force acts on rotor 72; this is compensated for by the attractive force between rotor 72 and stator element 75 in such a way that in the working position, an equilibrium of forces exists in the vertical direction. In the event of a deflection of rotor 72 out of that working position—by parallel displacement upward or downward and/or by tilting about a horizontal axis— electrical conductors 76 have applied to them control currents corresponding to the positional changes sensed by the position sensors in such a way that stator element 75 is magnetized, in sections, in such a way that rotor 72 is returned to the working position.

Any kind of structure whose purpose is to be caused to rotate can be mounted on rotor 72, for example blade wheels or disks for measuring flow velocities, or blade wheels for use in pumps, if magnetic bearing arrangement 71 is combined with a motor that causes rotor 72 to rotate. The same applies to magnetic bearing arrangement 41 according to FIG. 4.

It is understood that magnetic bearing arrangement 71 according to FIG. 6 can also be varied in that stator-side permanent magnet 74 is arranged externally so that it surrounds rotor 72, as is the case in principle in the embodiment shown in FIG. 4.

I claim:

1. A magnetic bearing assembly, comprising:
   a motion element having a working position,
   a passive magnetic bearing exerting repulsive forces to the motion element thereby guiding said motion element in a first plane,
   a controllable magnetic bearing for exerting a force to said motion element in a direction perpendicular to said first plane against the resistance of said repulsive forces of the passive magnetic bearing, said controllable magnetic bearing comprising:
      a magnetizable stator element, and
      an electronic stabilization device for controlling the magnetic force of said controllable magnetic bearing,
      said stabilization device comprising
      an electrical conductor for an electrical control current applied to said electrical conductor by said stabilization device, and
      a position sensor for sensing a position of said motion element,
   said passive magnetic bearing interacting with said stator element to hold said motion element in said working position without application of the electrical control current to said electrical conductor,
   said controllable magnetic bearing being applied with the control current as a function of signals of said position sensor, when said motion element is deflected from said working position, thereby influencing magnetization of said stator element and causing said motion element to return to said working position, and
   said controllable magnetic bearing being disposed only at one side of said motion element.

2. The magnetic bearing assembly of claim 1 wherein said motion element is comprised of a first permanent magnet.

3. The magnetic bearing assembly of claim 2 wherein said motion element comprises a axially extending rotor having a first end face and a second end face.

4. The magnetic bearing assembly of claim 3 wherein said rotor has said first permanent magnet on said first end face, and a second permanent magnet on said second end face.

5. The magnetic bearing assembly of claim 4 wherein said first permanent magnet is surrounded by a first annular permanent magnet.

6. The magnetic bearing assembly of claim 5 wherein said second permanent magnet is surrounded by a second annular permanent magnet.

7. The magnetic bearing assembly of claim 6 wherein said passive magnetic bearing is comprised of said first and second permanent magnets and said first and second annular magnets.

8. The magnetic bearing assembly of claim 5 wherein said first annular magnet is connected to said second annular magnet by a cylindrical sleeve.

9. The magnetic bearing assembly of claim 1 wherein said electromagnet has an annular shape and encircles said stator element.

10. The magnetic bearing assembly of claim 1 wherein said stabilization device includes a position sensor that senses a vertical position of said motion element.

11. A magnetic bearing assembly comprising:
    a motion element having a motion direction and a working position,
    a passive magnetic bearing exerting repulsive forces to the motion element thereby guiding said motion element in a first plane, said passive magnetic comprising at least one permanent magnet,
    a controllable magnetic bearing for exerting a force to said motion element in a direction perpendicular to said first plane against the resistance of said repulsive forces of the passive magnetic bearing, said controllable magnetic bearing exerting magnetic force on said motion element in a direction perpendicular to said motion direction, said controllable magnetic bearing comprising:
       at least one magnetizable stator element, and
       an electronic stabilization device for controlling the magnetic force of said controllable magnetic bearing, said electronic stabilization device comprising:
  at least one electrical conductor for an electrical control current applied to said electrical conductor by said stabilization device, and
  a position sensor for sensing a position of said motion element,
said passive magnetic bearing interacting with said magnetizable stator element to hold said motion element in said working position without an application of an electrical control current to said electrical conductor,
said controllable magnetic bearing is applied with the control current as a function of signals of said position sensor, when said motion element is deflected from said working position, thereby influencing a magnetization of said magnetizable stator element and causing said motion element to return to said working positions,
said controllable magnetic bearing is disposed only at one side of said motion element.

12. The magnetic bearing assembly of claim 11 wherein said passive magnetic bearing exerts a magnetic force on said motion element that is opposite of a force exerted by said controllable magnetic bearing so that said motion element is held in said working position.

13. The magnetic bearing assembly of claim 12 wherein said controllable magnetic bearing comprises a stator side and a motion element side,
  said controllable magnetic bearing motion element side comprising a first controllable magnetic bearing permanent magnet, said first controllable magnetic bearing permanent magnet being positioned on said motion element, and
  said controllable magnetic bearing stator side comprising said magnetizable stator element,
  wherein said first controllable magnetic bearing permanent magnet is positioned opposite said magnetizable stator element.

14. The magnetic bearing assembly of claim 13 wherein said magnetizable stator element comprises a permanent magnet.

15. The magnetic bearing assembly of claim 13 wherein said passive magnetic bearing comprises a stator side and a motion element side,
  said first controllable magnetic bearing permanent magnet comprises said passive magnetic bearing motion element side.

16. The magnetic bearing assembly of claim 15 wherein said controllable magnetic bearing motion element side also comprises said passive magnetic bearing motion element side.

17. The magnetic bearing assembly of claim 13 wherein said magnetizable stator element and said first controllable magnetic bearing permanent magnet are each comprised of sub-magnets.

18. The magnetic bearing assembly of claim 13 wherein said motion element comprises a linearly moveable member, said first controllable magnetic bearing permanent magnet and said passive magnetic bearing permanent magnet extending in the motion direction.

19. The magnetic bearing assembly of claim 13 wherein said motion element comprises a rotating member, said first controllable magnetic bearing permanent magnet having a circular shape.

20. The magnetic bearing assembly of claim 19 wherein said motion element and said magnetizable stator element have an annular shape.

21. The magnetic bearing assembly of claim 20 wherein at least two said electrical conductors are arranged over said magnetizable stator element.

22. The magnetic bearing assembly of claim 21 wherein each of said electrical conductors is a part of a separate electronic stabilization device.

23. The magnetic bearing assembly of claim 22 wherein said passive magnetic bearing is comprised of at least one stator side permanent magnet and at least one motion element side permanent magnet,
  said first controllable magnetic bearing permanent magnet comprising said at least one motion element side passive magnetic bearing permanent magnet,
  said first controllable magnetic bearing permanent magnet being surrounded by said at least one stator side permanent magnet.

24. The magnetic bearing assembly of claim 22 wherein said passive magnetic bearing is comprised of at least one stator side permanent magnet and at least one motion element side permanent magnet,
  said first controllable magnetic bearing permanent magnet comprising said at least one motion element side permanent magnet,
  said first controllable magnetic bearing permanent magnet surrounding said at least one stator side permanent magnet.

25. The magnetic bearing assembly of claim 22 wherein said passive magnetic bearing is comprised of at least one stator side permanent magnet and at least one motion element side permanent magnet,
  said first controllable magnetic bearing permanent magnet comprising said at least one motion element side permanent magnet,
  said first controllable magnetic bearing permanent magnet being enclosed by said at least one stator side permanent magnet, said at least one stator side permanent magnet having a circular shape.

26. The magnetic bearing assembly of claim 11 wherein each of said passive magnetic bearing permanent magnets is comprised of sub-magnets.

27. The magnetic bearing assembly of claim 11 wherein said magentizable stator element is operably associated with at least two electrical conductors.

28. The magnetic bearing assembly of claim 27 wherein each of said electrical conductors is a part of a separate stabilization device.

29. The magnetic bearing assembly of claim 11 wherein at least two passive magnetic bearings are linked to provide lateral guidance to said motion element.

30. The magnetic bearing assembly of claim 29 wherein said passive magnetic bearings are arranged at end regions of said motion element.

31. The magnetic bearing assembly of claim 11 wherein said magnetic bearing comprises at least two of said magnetizable stator element, at least one stabilization device is associated with each said magnetizable stator element.

32. The magnetic bearing assembly of claim 11 wherein said electrical conductor is positioned adjacent at least two sides of said magnetizable stator element.

* * * * *